US010532691B2

(12) United States Patent
Dellock et al.

(10) Patent No.: US 10,532,691 B2
(45) Date of Patent: Jan. 14, 2020

(54) LIGHTING ASSEMBLY INCLUDING LIGHT STRIP, PHOTOLUMINESCENT STRUCTURE, AND REFLECTOR AND POSITIONED ON VEHICLE PANEL

(71) Applicant: Ford Global Technologies, LLC, Dearborn, MI (US)

(72) Inventors: Paul Kenneth Dellock, Northville, MI (US); Stuart C. Salter, White Lake, MI (US); Christopher Anthony Danowski, Rochester Hills, MI (US); Jason C. Rogers, Shelby Township, MI (US); Chad Hoover, Washington, MI (US); Doug H. Randlett, Metamora, MI (US); Christopher Charles Hunt, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/052,818

(22) Filed: Aug. 2, 2018

(65) Prior Publication Data

US 2018/0370420 A1  Dec. 27, 2018

Related U.S. Application Data

(62) Division of application No. 15/092,160, filed on Apr. 6, 2016, now Pat. No. 10,081,296.

(51) Int. Cl.
*B60Q 1/26* (2006.01)
*B60Q 1/50* (2006.01)
(Continued)

(52) U.S. Cl.
CPC ............. *B60Q 1/2619* (2013.01); *B60Q 1/30* (2013.01); *B60Q 1/32* (2013.01); *B60Q 1/50* (2013.01); *F21K 9/64* (2016.08); *F21S 43/13* (2018.01)

(58) Field of Classification Search
CPC ....... G02B 5/128; F21K 9/64; F21Y 2115/10; F21Y 2103/10; B60Q 1/30; B60Q 1/302;
(Continued)

(56) References Cited

U.S. PATENT DOCUMENTS 2,486,859 A  11/1949  Meijer et al.
5,053,930 A  10/1991  Benavides
(Continued)

FOREIGN PATENT DOCUMENTS

CN  101337492 A  1/2009
CN  201169230 Y  2/2009
(Continued)

OTHER PUBLICATIONS

Ray, William J., Lowenthal, Mark D., Oraw, Bradley, S., "Printed Inorganic Light Emitting Diodes for Solid State Lighting," 2012, 3 pages, **Nth Degree Technologies Worldwide, Tempe, AZ.

*Primary Examiner* — Robert J May
(74) *Attorney, Agent, or Firm* — Vichit Chea; Price Heneveld LLP

(57) ABSTRACT

A vehicle light strip is provided herein. The vehicle light strip includes a light-producing assembly including a plurality of light sources arranged as a strip attached to a panel. The light-producing assembly is angled in a downward direction to illuminate a ground surface. A photoluminescent structure is disposed on the light-producing assembly and is configured to luminesce in response to excitation by the plurality of light sources. One or more retroreflective beads is configured to reflect an incident light directed towards the
(Continued)

light-producing assembly. An optic is operably coupled with the light-producing assembly and is disposed externally of the one or more retroreflective beads for distributing an excitation light in a predefined direction.

20 Claims, 12 Drawing Sheets

(51) Int. Cl.
  *F21S 43/13* (2018.01)
  *F21K 9/64* (2016.01)
  *B60Q 1/30* (2006.01)
  *B60Q 1/32* (2006.01)

(58) Field of Classification Search
  CPC .......... B60Q 1/305; B60Q 1/307; B60Q 1/32; B60Q 1/323; B60Q 1/326; B60Q 1/2619
  See application file for complete search history.

(56) References Cited

U.S. PATENT DOCUMENTS

| | | |
|---|---|---|
| 5,122,939 A | 6/1992 | Kazdan |
| 5,434,013 A | 7/1995 | Fernandez |
| 5,467,071 A | 11/1995 | Koenig |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,619,831 B2 | 9/2003 | Kanesaka |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,237,932 B2 | 7/2007 | Ter-Hovhannissian |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,905,611 B1 | 3/2011 | Bourget |
| 7,922,358 B2 | 4/2011 | von Malm |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,075,169 B2 | 12/2011 | Englander |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,274,397 B2 | 9/2012 | Wilson et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,698,610 B2 | 4/2014 | Krugh, IV |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal |
| 9,315,148 B2 | 4/2016 | Schwenke et al. |
| 9,568,659 B2 | 2/2017 | Verger et al. |
| 9,616,806 B2 | 4/2017 | Buley |
| 9,616,812 B2 | 4/2017 | Sawayanagi |
| 9,775,391 B1 | 10/2017 | Gonzalez |
| 9,797,567 B2 | 10/2017 | Kastner |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0013140 A1 | 1/2005 | Currie |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0059615 A1 | 3/2009 | Wainright |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |

(56) References Cited

U.S. PATENT DOCUMENTS

| | | |
|---|---|---|
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0225727 A1 | 8/2014 | Niazi |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 102485534 A | 6/2012 |
| CN | 103883968 A | 6/2014 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| ES | 1078253 U | 12/2012 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

LIGHTING ASSEMBLY INCLUDING LIGHT STRIP, PHOTOLUMINESCENT STRUCTURE, AND REFLECTOR AND POSITIONED ON VEHICLE PANEL

CROSS-REFERENCE TO RELATED APPLICATION

This application is a divisional of and claims priority to U.S. patent application Ser. No. 15/092,160 entitled "ILLUMINATED EXTERIOR STRIP," filed on Apr. 6, 2016, by Dellock et al., the entire disclosure of which is incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to some examples of the present disclosure, a vehicle light strip is provided herein. The vehicle light strip includes a light-producing assembly including a plurality of light sources arranged as a strip attached to a panel. The light-producing assembly is angled in a downward direction to illuminate a ground surface. A photoluminescent structure is disposed on the light-producing assembly and is configured to luminesce in response to excitation by the plurality of light sources. One or more retroreflective beads is configured to reflect an incident light directed towards the light-producing assembly. An optic is operably coupled with the light-producing assembly and is disposed externally of the one or more retroreflective beads for distributing an excitation light in a predefined direction.

According to some examples of the present disclosure, a vehicle light strip is provided herein. The light strip includes a light source disposed on a pedestrian guard and including a first printed LED oriented in a first direction and a second printed LED oriented in a second, opposing direction. A translucent reflective layer is configured to reflect an incident light directed at a first side of the reflective layer and allow a converted light directed at a second, opposing side of the reflective layer to pass therethrough.

According to some examples of the present disclosure, a vehicle light strip is disclosed. The light strip includes a first light source oriented in a first direction and a second light source oriented in a second, opposing direction. A photoluminescent structure is disposed on the first light source. A translucent reflective layer is outwardly of the first light source and configured to reflect an incident light directed at a first side of the reflective layer and allow light from the first light source through a second, opposing side.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated light strip that may be attached to a vehicle. The light strip may include one or more photoluminescent structures configured to convert an excitation light received from an associated light source to a converted light at a different wavelength typically found in the visible spectrum.

Figure 1A:
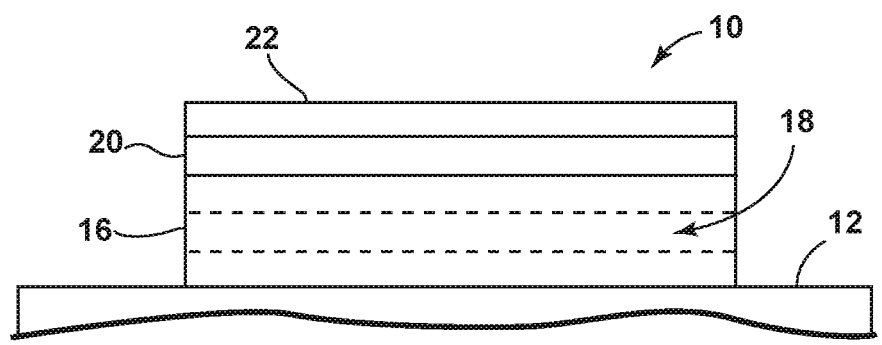
FIG. 1A is a side view of a photoluminescent structure rendered as a coating for use in a vehicle light strip according to one embodiment.
Figure 1B:
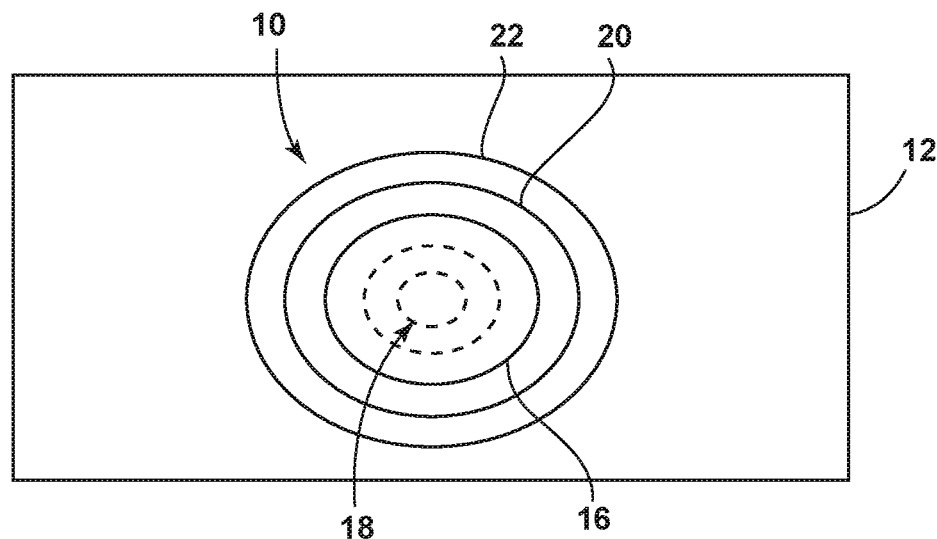
FIG. 1B is a top view of a photoluminescent structure rendered as a discrete particle according to one embodiment.
Figure 1C:
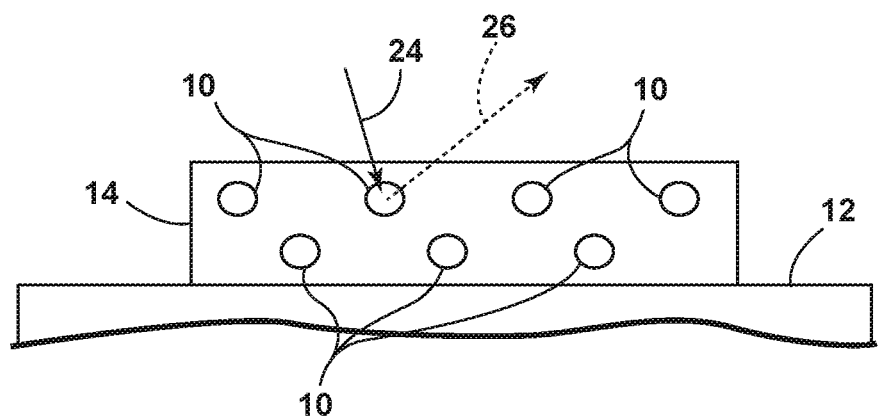
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 44 (FIG. 2) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 A1 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 44. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 44). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light source 44 that emits the excitation light 24, including, but not limited to, natural light sources (e.g., the sun) and/or any artificial light source 44. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
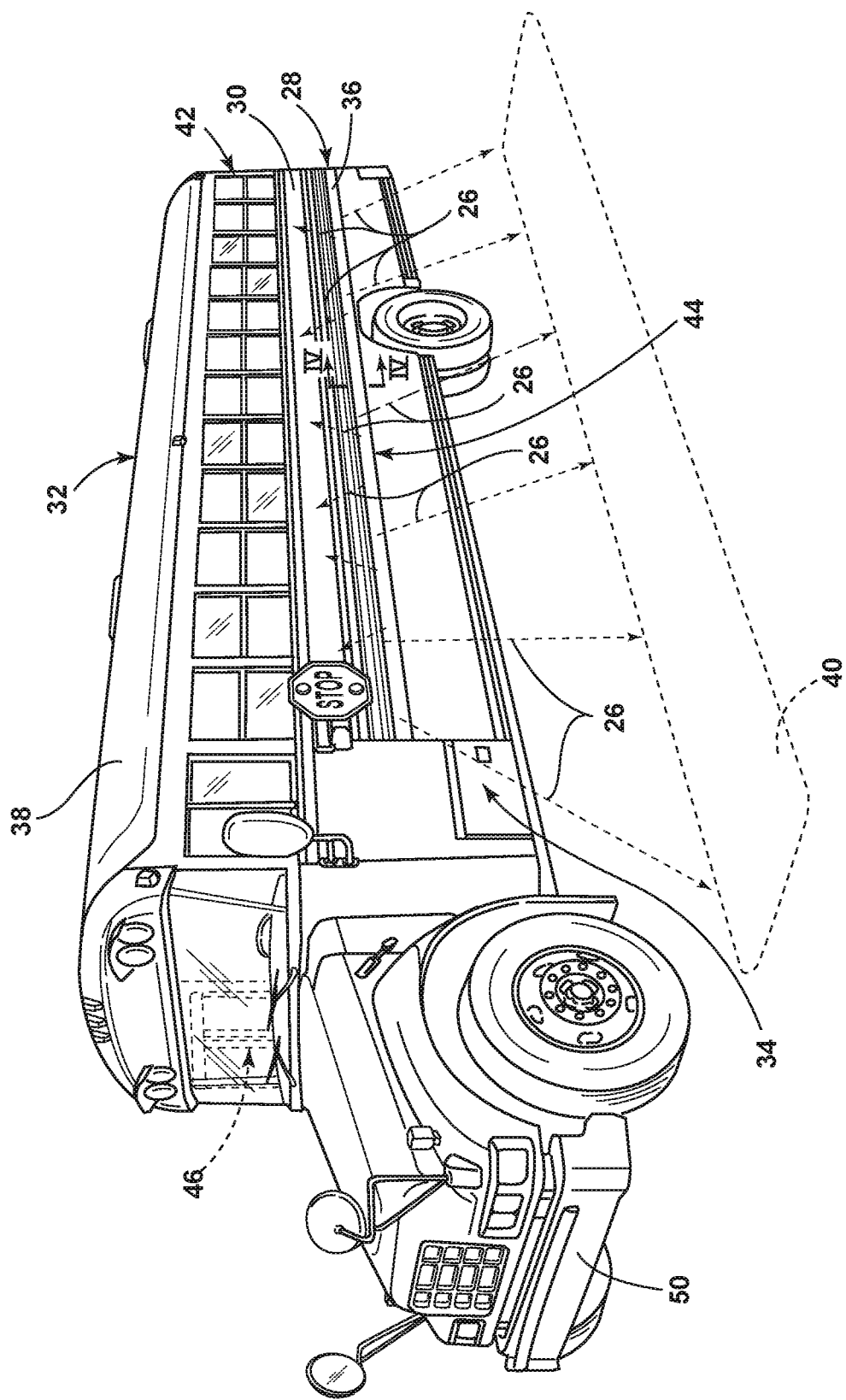
FIG. 2 is a front perspective view of a vehicle employing a light strip on a side body panel according to one embodiment.

Referring to FIG. 2, a light strip 28 is attached to an exterior of a body panel 30 of a vehicle 32 and is configured to illuminate an exterior portion 34 of the vehicle 32, according to one embodiment. As shown in FIG. 2, the light strip 28 is arranged as an elongated assembly extending longitudinally along a portion of the panel 30. The elongated light strip 28 may be formed from one or more portions.

The vehicle 32, in some embodiments, may be configured as a commercial or public vehicle 32, such as a school bus 38. The light strip 28 may assist a vehicle operator, such as the school bus driver, in preventing accidents involving passengers boarding or exiting from the vehicle 32. For example, during times of poor visibility and/or when it is dark outside, such as at night, twilight, late winter afternoons, etc., passengers who are waiting to board the vehicle 32 may linger or fall near the vehicle 32 and accidentally end up near or underneath the vehicle 32, as it starts moving. The light strip 28 shown in FIG. 2 aids the school bus driver in spotting children or fallen objects underneath or near the vehicle 32. Accordingly, the light strips 28 may be focused downwardly to illuminate a portion of the ground 40 or the space just above the ground 40 along a side of the vehicle 32.

A light source 44 may be disposed on and/or within the light strip 28 and oriented such that light may be emitted therefrom. The light source 44 may include any form of light source. For example, fluorescent lighting, light-emitting diodes (LEDs), organic LEDs (OLEDs), polymer LEDs (PLEDs), solid-state lighting, or any other form of lighting configured to emit light may be utilized. According to one embodiment, one or more light sources 44 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs.

According to one embodiment, the light strip(s) 28 may be configured to luminesce in response to excitation light emitted from the light source 44. The luminescence exhibited by the light strip 28 may provide one or more distinct lighting functions. For instance, the light strip 28 may luminesce in a first color to indicate that it is safe to cross in front of the vehicle 32 and/or to leave the sidewalk. In another instance, the light strip 28 may luminesce in a second color that is visually distinct from the first color to indicate that it is not safe to pass in front of the vehicle 32. Such illumination patterns, in addition to guiding the children and their guardians, may also serve to alert other drivers to the presence of children and to remind them of the requirement that they not enter the children's crossing area near the vehicle 32. The light strip 28 may also be wired to automatically display messages 136, 138, 140 (FIG. 6) or arrows based on the opening or closing of a door 46, and/or any other vehicular condition.

Figure 3:
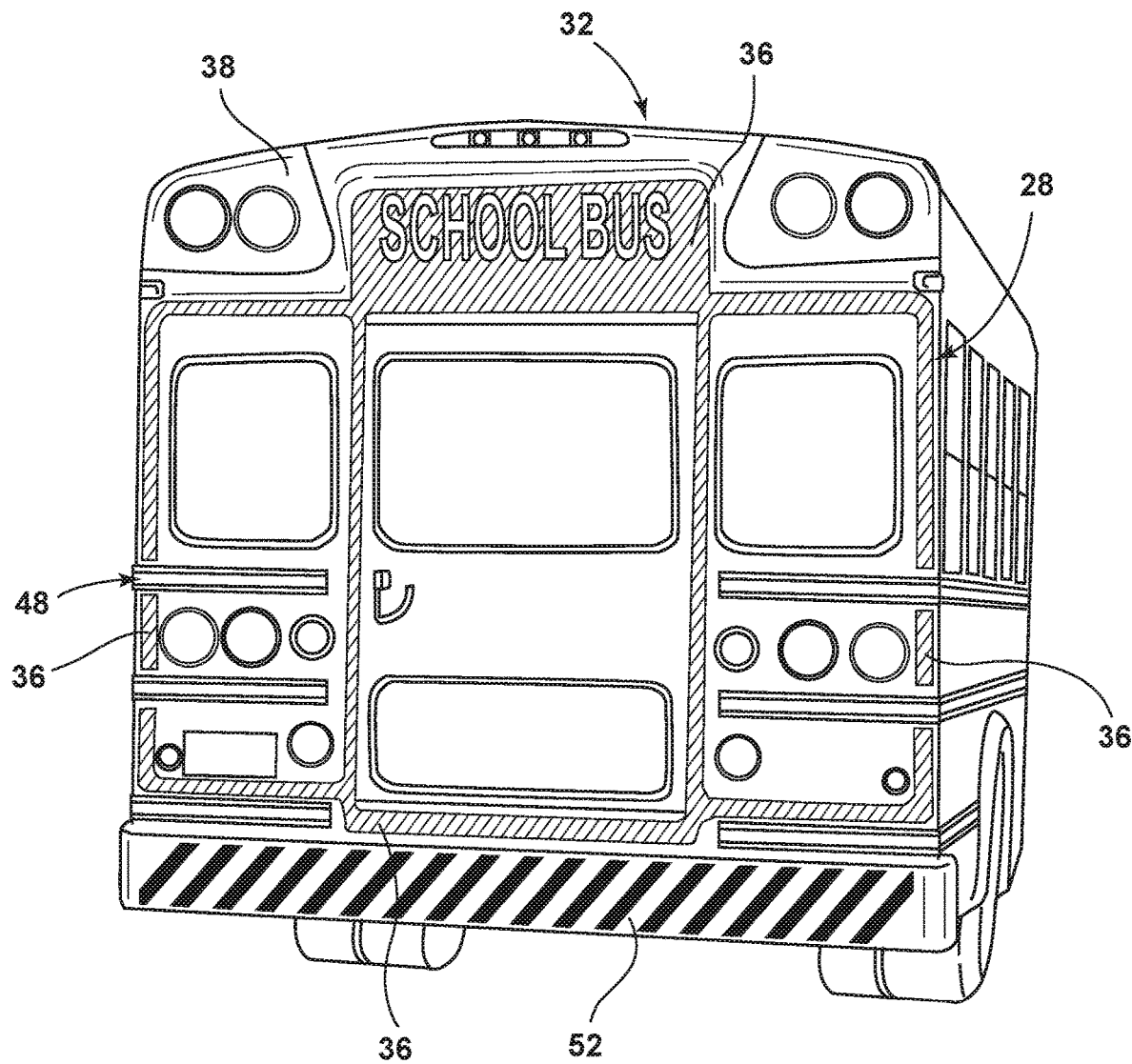
FIG. 3 is a rear perspective view of the vehicle employing light strips on a rear body panel, according to one embodiment.

Referring to FIG. 3, one or more light strips 28 may be provided on a rear side 48 of the vehicle 32. The light strip(s) 28 may have a linear and/or non-linear shape and may be configured to outline safety exits, or any other desired feature, of the vehicle 32. Moreover, the light strip 28 may be permanently or removably disposed on locations that are easily viewable to other proximately located vehicles. For example, a light strip 28 may be disposed on a front 50 and/or a rear bumper 52 of the vehicle 32.

The light strips 28 may be oriented slightly downward to focus the light to where it is most needed and to reduce interference with the school bus operator's visibility. Thus, the entire light strip 28 may be mounted at a slightly angled manner to focus light downward, or the individual light sources 44 within the light strip 28 may be orientated to focus light downward or through the use of optics.

Figure 4A:
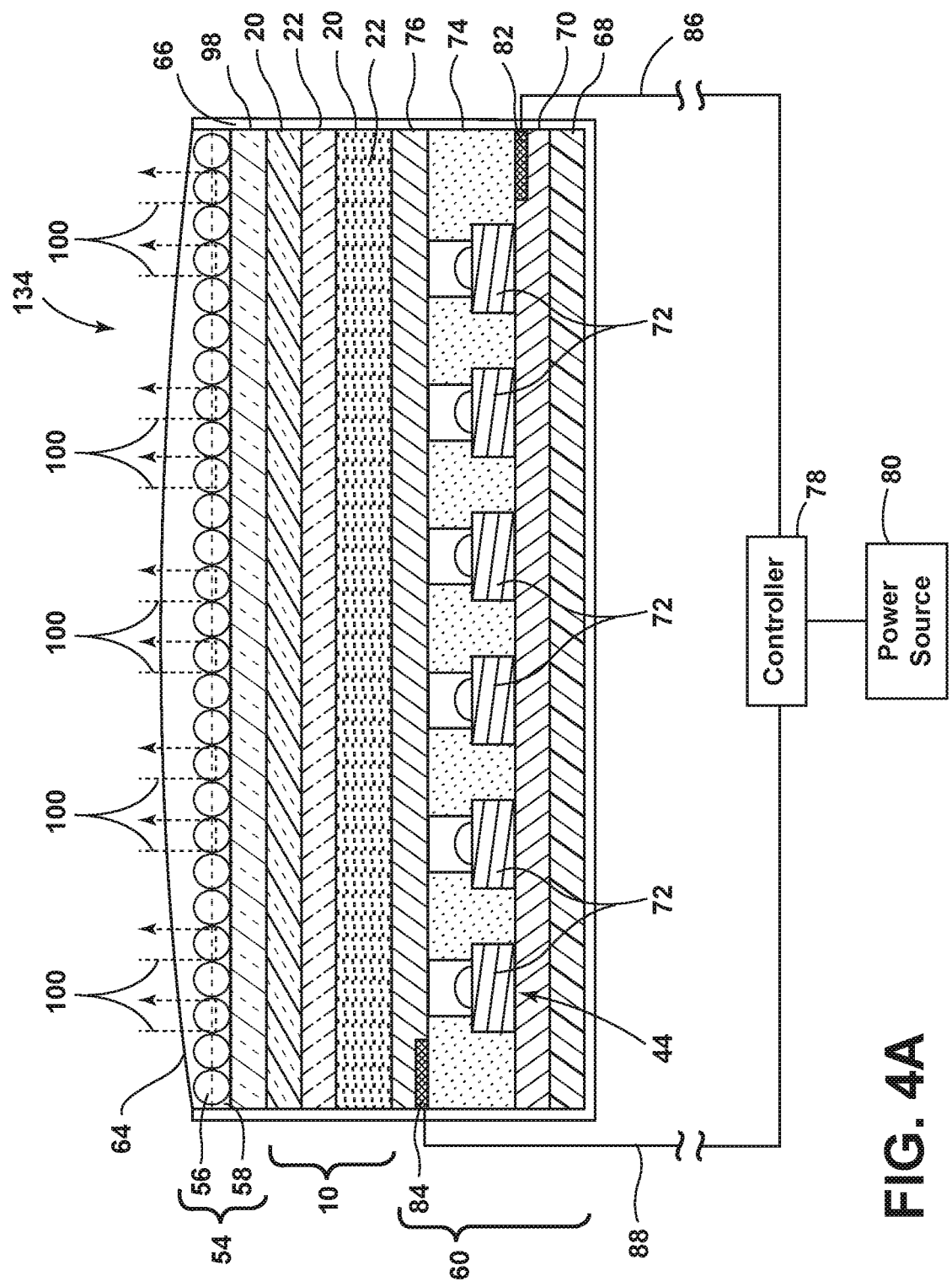
FIG. 4A is a cross-sectional view taken along line IV-IV of FIG. 2 illustrating a light source according to one embodiment.

Referring to FIGS. 4A-4E, a cross-sectional view of the light source 44 capable of use on a vehicle 32 with an external photoluminescent structure 10 is shown according to one embodiment. As illustrated in FIG. 4A, the light source 44 may have a stacked arrangement that includes a light-producing assembly 60, a photoluminescent structure 10, a viewable portion 64, a reflective layer 54, and an overmold material 66. It should be appreciated that the viewable portion 64 and the overmold material 66 may be two separate components, or may be integrally formed as a single component.

The light-producing assembly 60 may correspond to a thin-film or printed light-emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle substrate on which the light source 44 is to be received (e.g., the body panel 30). Alternatively, as a cost saving measure, the substrate 68 may directly correspond to a preexisting structure (e.g., a portion of the body panel 30, etc.).

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit converted light 26 towards a desired location.

The LED sources 72 may be dispersed in a random or controlled fashion within the semiconductor ink 74 and may be configured to emit focused or non-focused light toward the photoluminescent structure 10. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies 60 is disclosed in U.S. Patent Publication No. 2014/0264396 A1 to Lowenthal et al. entitled "ULTRA-THIN PRINTED LED LAYER REMOVED FROM SUBSTRATE," the entire disclosure of which is incorporated herein by reference.

Referring still to FIG. 4A, the photoluminescent structure 10 is arranged over the negative electrode 76 as a coating, layer, film or other suitable deposition. With respect to the presently illustrated embodiment, the photoluminescent structure 10 may be arranged as a multi-layered structure including an energy conversion layer 16, optional stability layer 20, and optional protective layer 22, as described above.

In some embodiments, a decorative layer 98 may be disposed between a viewable portion 64 and the photoluminescent structure 10. However, the decorative layer 98 may be disposed in any other location within the light strip 28 in alternate embodiments. The decorative layer 98 may include a polymeric material or any other suitable material and is configured to control or modify an appearance of the viewable portion 64. For example, the decorative layer 98 may be configured to confer a metallic appearance to the viewable portion 64. The metallic appearance can be disposed rearwardly of the viewable portion 64 through any method known in the art, including, but not limited to, sputter deposition, vacuum deposition (vacuum evaporation coating), electroplating, or directly printing onto a component of the light strip 28. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein.

In other embodiments, the decorative layer 98 may be tinted any color to complement the vehicle structure on which the light strip 28 is to be received. In any event, the decorative layer 98 may be at least partially light transmissible such that the converted light 26 is not prevented from illuminating the front viewable portion 64.

A reflective layer 54 may also be disposed above the photoluminescent structure 10. The reflective layer 54 may include clear, translucent, and/or opaque portions and may be colored any desired color. The reflective layer 54 may include any retroreflective material that generally functions to reflect incident light 100 that is directed from the environment proximate the light strip 28 towards the viewable portion 64. According to one embodiment, the reflective layer 54 is configured as a plurality of retroreflective beads 56. The beads 56 may be formed from a glass material, a polymeric material, and/or any other practicable material. In some embodiments, a portion of the beads 56 may be a first material (e.g., a glass) and a second portion of the beads 56 may be a second material (e.g., a polymeric material). The beads 56 may have a solid construction, or may be hollow. In embodiments where the beads 56 have a hollow core, the internal void may include any type of material, solid, liquid, or gas, without departing from the teachings provided herein. It will be appreciated that in alternate embodiments, retroreflective materials other than beads may be utilized within the retroreflective layer without departing from the teachings provided herein.

According to one embodiment, the material within the beads may have a different refractive index than the material of the beads. The beads may have a substantially spherical shape, an oblong shape, an irregular shape, or combinations thereof. The beads may range in size from about 60 μm (0.0024 inches) to about 850 μm (0.034 inches). The bead size may be expressed in terms of U.S. sieve number, or the size of mesh screen that a bead will pass through. For example, a U.S. Sieve Number 20 will permit beads with a diameter of 840 μm (0.033 inches) or less to pass through the mesh, whereas a Number 200 mesh will allow those beads of 74 μm (0.0029 inches) or less to pass. According to one embodiment, the beads may be chosen from 20 to 200 U.S. Sieve Number. The beads, according to one embodiment, are substantially mono dispersed in size and/or shape. According to an alternate embodiment, the beads may be configured in a variety of sizes and/or shapes that are randomly distributed within a light transmissive adhesive layer 58.

According to one embodiment, the reflective layer 54 may contain over 10, 100 or 1000 beads 56 per square foot that are bonded to the light-producing assembly 60 within a translucent adhesive layer 58. The beads 56 and/or adhesive layer 58 may be printed onto the light-producing assembly 60. Instead of scattering light, the retroreflective glass beads 56 may reflect incident light 100 (e.g., ambient light) and redirect the incident light 100 away from the light-producing assembly 60 thereby creating reflective characteristics. For the beads 56 to retroreflect light, the beads 56 may be partially transparent and substantially round. However, it will be understood that the beads may be translucent and/or any other shape without departing from the teachings provided herein.

The transparency of the glass beads 56 may allow incident light 100, or ambient light, to pass into and be subsequently redirected out of the beads 56. As the incident light 100 enters the bead 56, it may be bent (refracted) by the rounded surface of the beads 56 to a point below where the beads 56 are embedded in the adhesive layer 58. The incident light 100 striking the back of the bead surfaces, which are embedded within the adhesive layer 58, may then be reflected outwardly in a substantially convergent direction to which the incident light 100 entered the beads 56, with only a small fraction of the light going back toward the photoluminescent structure 10 and/or the light-producing assembly 60. In some embodiments, the decorative layer and the adhesive layer 58 may be a single layer.

The glass beads 56 may be applied to the photoluminescent structure 10 and/or the light-producing assembly 60 in a premixed solution, disposed into the wet adhesive layer 58, dropped onto a premixed two-part epoxy or thermoplastic material, and/or through any other process known in the art. According to one embodiment, the glass beads 56 may be embedded to about greater than about 10%, 20%, 30%, 40%, 50% or 60% of the diameter of the beads 56. In other words, a portion of the beads may protrude from the adhesive layer 58. It will be understood that multiple contiguous layers of beads 56 may be utilized within the paint such that some beads 56 are completely surrounded by the adhesive layer 58 while other beads 56 protrude. The depth of the beads 56 within the adhesive layer 58 may be consistent across the light strip 28 or may vary across the light strip 28 such that certain areas are highlighted. In some embodiments, it may be desired to provide a consistent quality of both beads 56 and adhesive layer thickness 58 to promote even retroreflectivity along the light strip 28.

The retroreflected light from the glass beads 56 may be a function of three variables including the index of refraction of the glass beads 56; the bead 56 shape, size, and surface characteristics; and the number of beads 56 present and exposed to incident light 100. The bead's 56 Refractive Index (RI) is a function of the chemical makeup of the beads 56. The higher the RI, the more incident light 100 that is retroreflected. According to one embodiment, the beads 56 disposed on the light-producing assembly 60 have a refractive index in the range of 1 to 2.

The viewable portion 64 is arranged over the photoluminescent structure 10. In some embodiments, the viewable portion 64 may include a plastic, silicon, or urethane material and is molded over the reflective layer 54, the photoluminescent structure 10, and/or the light-producing assembly 60. Preferably, the viewable portion 64 should be at least partially light transmissible. In this manner, the viewable portion 64 will be illuminated by the photoluminescent structure 10 whenever an energy conversion process is underway. Additionally, over-sealing the viewable portion 64 may also function to protect the photoluminescent structure 10 and the light-producing assembly 60. The viewable portion 64 may be arranged in a planar shape and/or an arcuate shape to enhance its viewing potential. Like the photoluminescent structure 10 and the light-producing assembly 60, the viewable portion 64 may also benefit from a thin design, thereby helping to fit the light source 44 into small package spaces of the vehicle 32.

The overmold material 66 is disposed around the light-producing assembly 60, the photoluminescent structure 10, and/or the reflective layer 54. According to one embodiment, the overmold material 66 may be disposed around a top portion of the retroreflective beads 56 and form some, or all, of the viewable portion 64. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the environmental contaminants, such as dirt and water that may come in contact with the body of the vehicle 32. It is also contemplated that the viewable portion 64 may be formed by a portion of the overmold material 66.

In some embodiments, the photoluminescent structure 10 may be employed separate and apart from the light-producing assembly 60. For example, the photoluminescent structure 10 may be positioned on a rim, a tire, a window, and/or any surface proximate, but not in physical contact with, the light-producing assembly 60. It should be understood that in embodiments where the photoluminescent structure 10 is incorporated into distinct components separated from the light source 44, the light source 44 might still have the same or similar structure to the light source 44 described in reference to FIG. 4A.

Figure 4B:
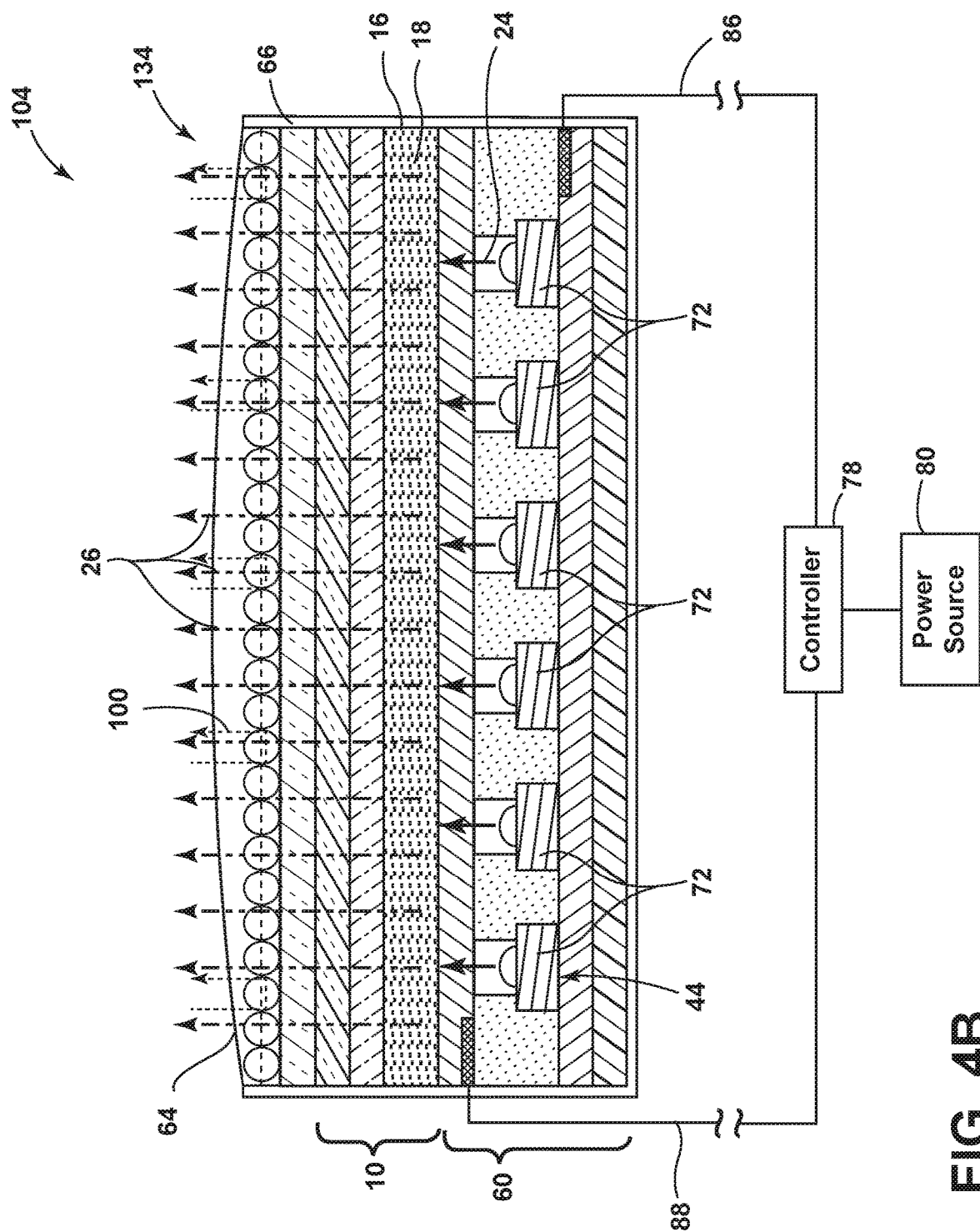
FIG. 4B is a cross-sectional view taken along line IV-IV of FIG. 2 further illustrating the light source, according to one embodiment.

Referring to FIG. 4B, an energy conversion process 104 for producing single color luminescence is illustrated according to one embodiment. For purposes of illustration, the energy conversion process 104 is described below using the light source 44 depicted in FIG. 4A. In this embodiment, the energy conversion layer 16 of the photoluminescent structure 10 includes a single photoluminescent material 18, which is configured to convert excitation light 24 received from LED sources 72 into converted light 26 having a wavelength different than that associated with the excitation light 24. More specifically, the photoluminescent material 18 is formulated to have an absorption spectrum that includes the emission wavelength of the excitation light 24 supplied from the LED sources 72. The photoluminescent material 18 is also formulated to have a Stokes shift resulting in the converted visible light 26 having an emission spectrum expressed in a desired color, which may vary per lighting application. The converted visible light 102 is outputted from the light source 44 via the viewable portion 64, thereby causing the viewable portion 64 to illuminate in the desired color. The illumination provided by the viewable portion 64 may offer a unique, substantially uniform, and/or attractive viewing experience that may be difficult to duplicate through non-photoluminescent means.

Figure 4C:
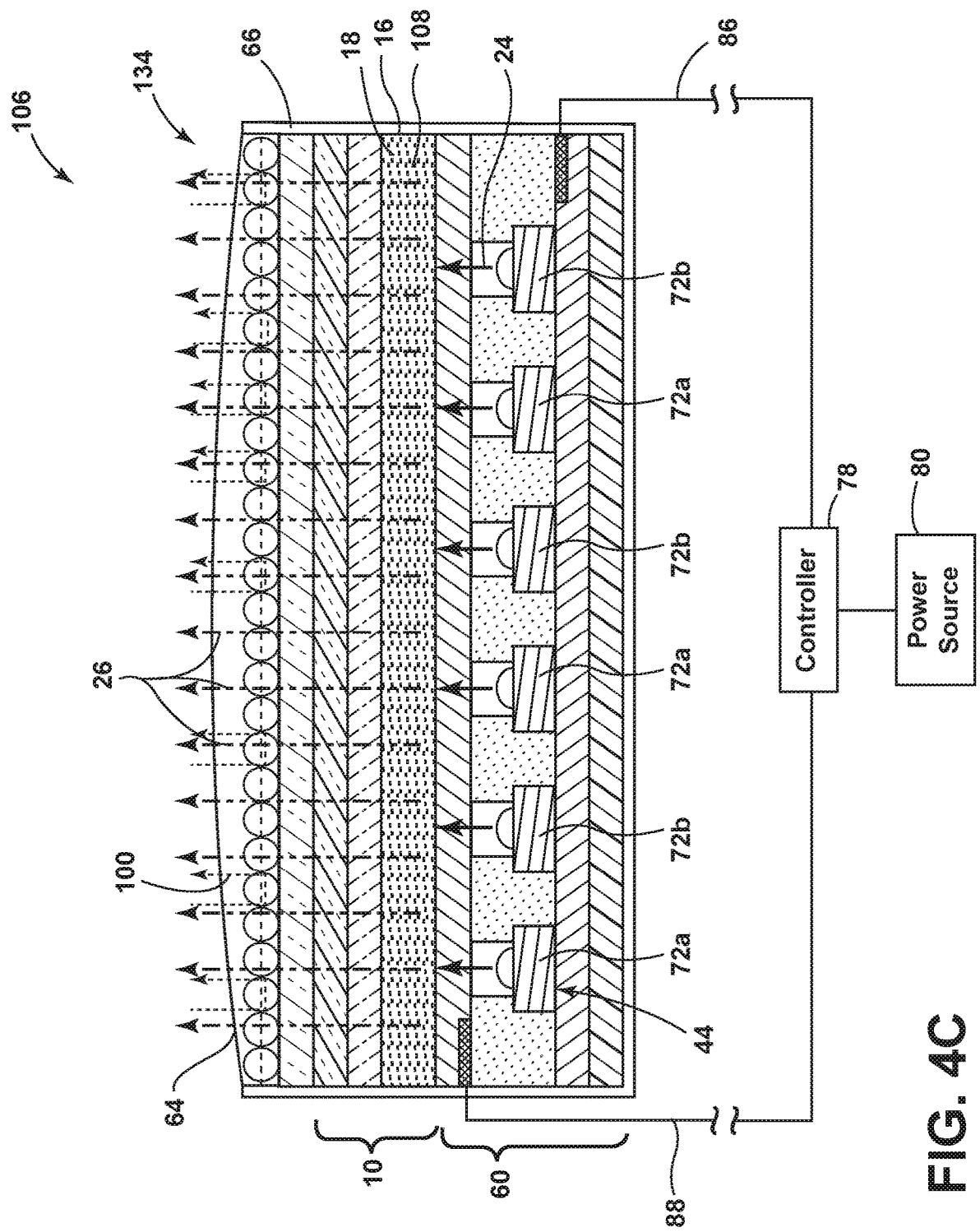
FIG. 4C is a cross-sectional view taken along line IV-IV of FIG. 2 illustrating an alternate light source, according to one embodiment.

Referring to FIG. 4C, a second energy conversion process 106 for generating multiple colors of light is illustrated according to one embodiment. For consistency, the second energy conversion process 106 is also described below using the light source 44 depicted in FIG. 4A. In this embodiment, the energy conversion layer 16 includes the first and second photoluminescent materials 18, 108 that are interspersed within the energy conversion layer 16. Alternatively, the photoluminescent materials 18, 108 may be isolated from each other if desired. Also, it should be appreciated that the energy conversion layer 16 may include more than two different photoluminescent materials 18 and 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 18, 108 is mutually exclusive. That is, photoluminescent materials 18, 108 are formulated to have non-overlapping absorption spectrums and Stokes shifts that yield different emission spectrums. Also, in formulating the photoluminescent materials 18, 108, care should be taken in choosing the associated Stokes shifts such that the converted light 26 emitted from one of the photoluminescent materials 18, 108, does not excite the other, unless so desired. According to one exemplary embodiment, a first portion of the LED sources 72, exemplarily shown as LED sources 72a, is configured to emit an excitation light 24 having an emission wavelength that only excites photoluminescent material 18 and results in the excitation light 24 being converted into a visible light 102 of a first color (e.g., white). Likewise, a second portion of the LED sources 72, exemplarily shown as LED sources 72b, is configured to emit an excitation light 24 having an emission wavelength that only excites second photoluminescent material 108 and results in the excitation light 24 being converted into a visible light 102 of a second color (e.g., red). Preferably, the first and second colors are visually distinguishable from one another. In this manner, LED sources 72a and 72b may be selectively activated using the controller 78 to cause the photoluminescent structure 10 to luminesce in a variety of colors. For example, the controller 78 may activate only LED sources 72a to exclusively excite photoluminescent material 18, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 18, 108 to become excited, resulting in the viewable portion 64 illuminating in a third color, which is a color mixture of the first and second color (e.g., pinkish). The intensities of the excitation light 24 emitted from each light source 44 may also be proportionally varied to one another such that additional colors may be obtained. For energy conversion layers 16 containing more than two distinct photoluminescent materials 18, a greater diversity of colors may be achieved. Contemplated colors include red, green, blue, and combinations thereof, including white, all of which may be achieved by selecting the appropriate photoluminescent materials 18 and correctly manipulating the corresponding LED sources 72.

Figure 4D:
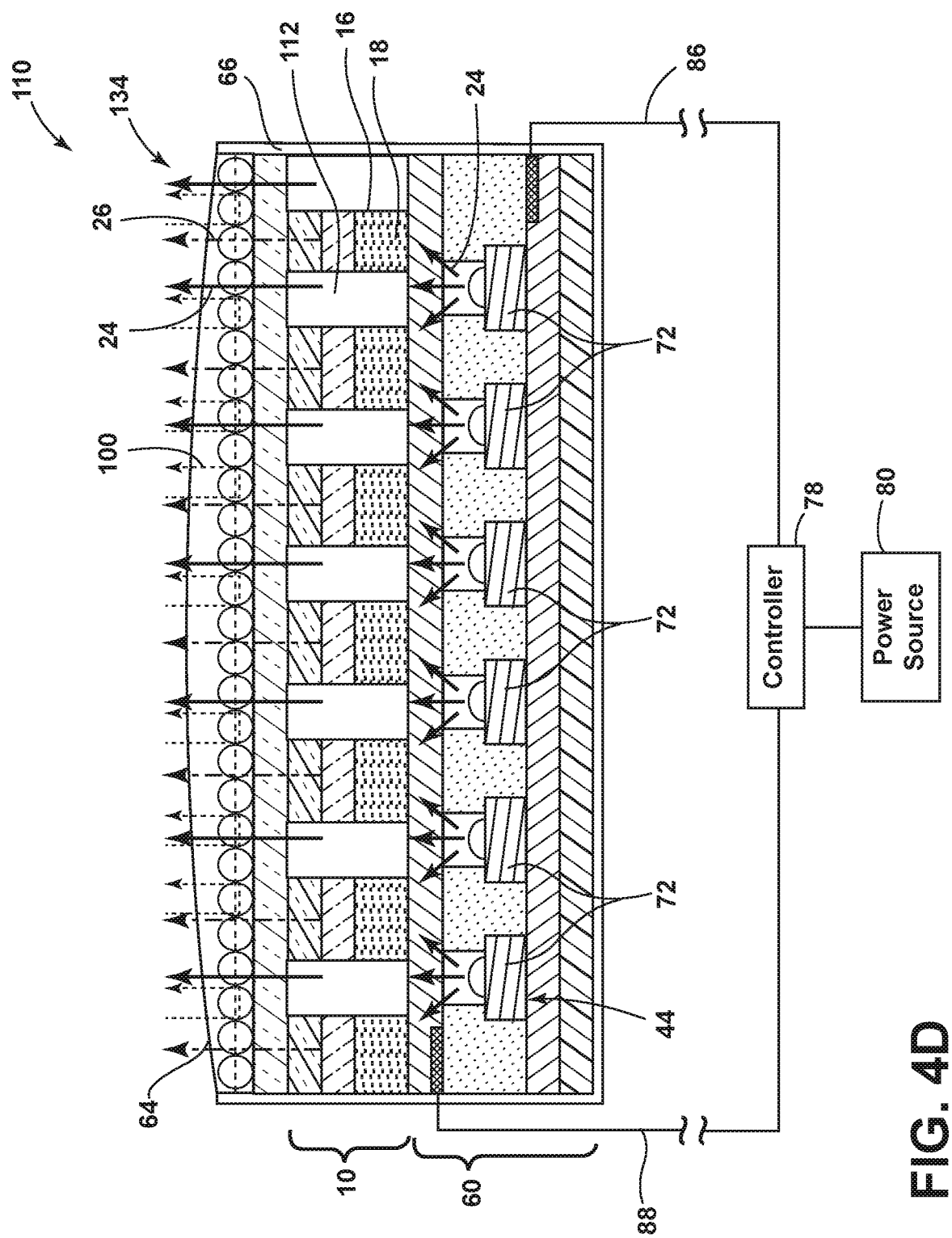
FIG. 4D is a cross-sectional view taken along line IV-IV of FIG. 2 illustrating a light source having a luminescent structure separated by light transmissive portions disposed on the light source, according to one embodiment.

Referring to FIG. 4D, a third energy conversion process 110 includes a light-producing assembly 60, such as the one described in reference to FIG. 4A, and a photoluminescent material 108 disposed thereon is illustrated, according to an alternate embodiment. The photoluminescent material 108 is configured to convert excitation light 24 received from LED sources 72 into a visible light 102 having a wavelength different than that associated with the excitation light 24. More specifically, the photoluminescent structure 10 is formulated to have an absorption spectrum that includes the emission wavelength of the excitation light 24 supplied from the LED sources 72. The photoluminescent material 18 is also formulated to have a Stokes shift resulting in the converted visible light 102 having an emission spectrum expressed in a desired color, which may vary per lighting application.

The photoluminescent structure 10 may be applied to a portion of the light-producing assembly 60, for example, in a striped manner. Between the photoluminescent structures 10 may be light transmissive portions 112 that allow excitation light 24 emitted from the LED sources 72 to pass therethrough at the first wavelength. The light transmissive portions 112 may be an open space, or may be a transparent or translucent material. The excitation light 24 emitted through the light transmissive portions 112 may be directed from the light-producing assembly 60 towards a second photoluminescent structure disposed proximate to the light-producing assembly 60. The second photoluminescent structure may be configured to luminesce in response to the excitation light 24 that is directed through the light transmissive portions 112.

Figure 4E:
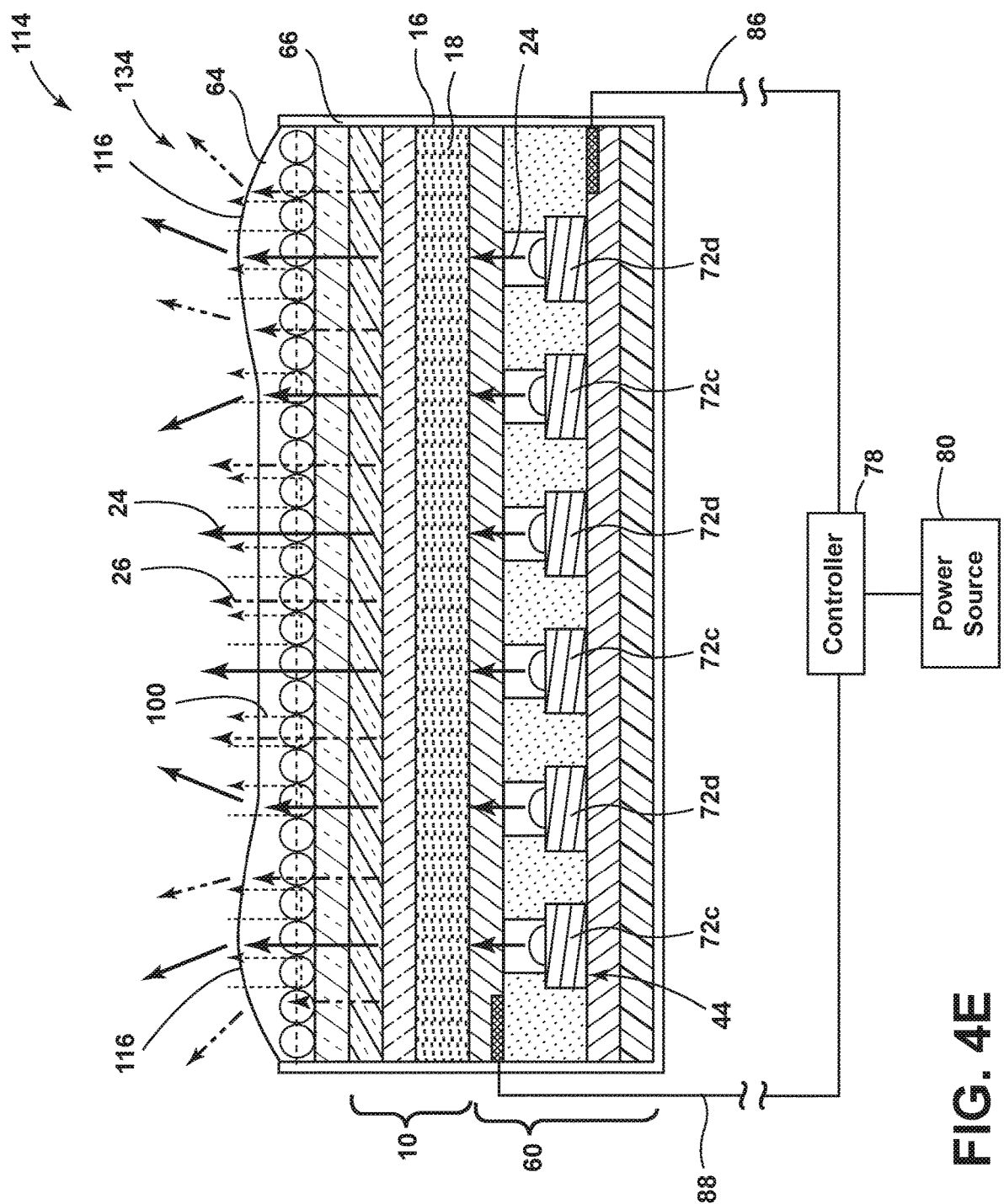
FIG. 4E is a cross-sectional view taken along line IV-IV of FIG. 2 illustrating an alternate light source having a luminescent structure disposed on the light source configured to convert a portion of light emitted from the light source from a first wavelength to a second wavelength, according to one embodiment.

Referring to FIG. 4E, a fourth energy conversion process 114 for generating multiple colors of light utilizing the light-producing assembly 60, such as the one described in reference to FIG. 4A, and a photoluminescent structure 10 disposed thereon is illustrated. In this embodiment, the photoluminescent structure 10 is disposed over a top portion of the light-producing assembly 60. The excitation of photoluminescent material 18 is formulated such that a portion of excitation light 24 emitted from the LED sources 72 passes through the photoluminescent structure 10 at the first wavelength (i.e., the excitation light 24 emitted from the light source 44 is not converted by the photoluminescent structure 10). The intensity of the outputted light (i.e., the combination of the excitation light 24 and converted light 26) may be modified by pulse-width modulation or current control to vary the amount of excitation light 24 emitted from the LED sources 72 that passes through the photoluminescent structure 10 without converting to a second, outputted 102 wavelength. For example, if the light source 44 is configured to emit excitation light 24 at a low level, substantially all of the excitation light 24 may be converted to converted light 26. In this configuration, a color of light 102 corresponding to the photoluminescent structure 10 may be emitted from the light-producing assembly 60. If the light source 44 is configured to emit excitation light 24 at a high level, only a portion of the first wavelength may be converted by the photoluminescent structure 10. In this configuration, a first portion of the outputted light may be converted by the photoluminescent structure 10 and a second portion of the outputted light may be emitted from the light-producing assembly 60 at the first wavelength towards additional photoluminescent structures disposed proximately to the light source 44. The additional photoluminescent structures may luminesce in response to the excitation light 24 emitted from the light source 44.

According to one exemplary embodiment, a first portion of the LED sources 72, exemplarily shown as LED sources 72a is configured to emit an excitation light 24 having a wavelength that excites the photoluminescent material 18 within the photoluminescent structure 10 and results in the excitation light 24 being converted into a visible light 102 of a first color (e.g., white). Likewise, a second portion of the LED sources 72, exemplarily shown as LED sources 72c, is configured to emit an excitation light 24 having a wavelength that passes through the photoluminescent structure 10 and excites additional photoluminescent structures disposed proximately to the light strip 28 thereby illuminating in a second color. The first and second colors may be visually distinguishable from one another. In this manner, LED sources 72a and 72c may be selectively activated using the controller 78 to cause the light strip 28 to luminesce in a variety of colors.

The light-producing assembly 60 may also include optics 116 that are configured to direct excitation light 24 emitted from the LED sources 72a, 72c and the light 102 emitted from the photoluminescent structure 10 towards predefined locations. For example, excitation light 24 emitted from the LED sources 72a, 72c and the photoluminescent structure 10 may be directed and/or focused towards the ground 40 and/or a location proximate to the light strip 28.

Figure 5:
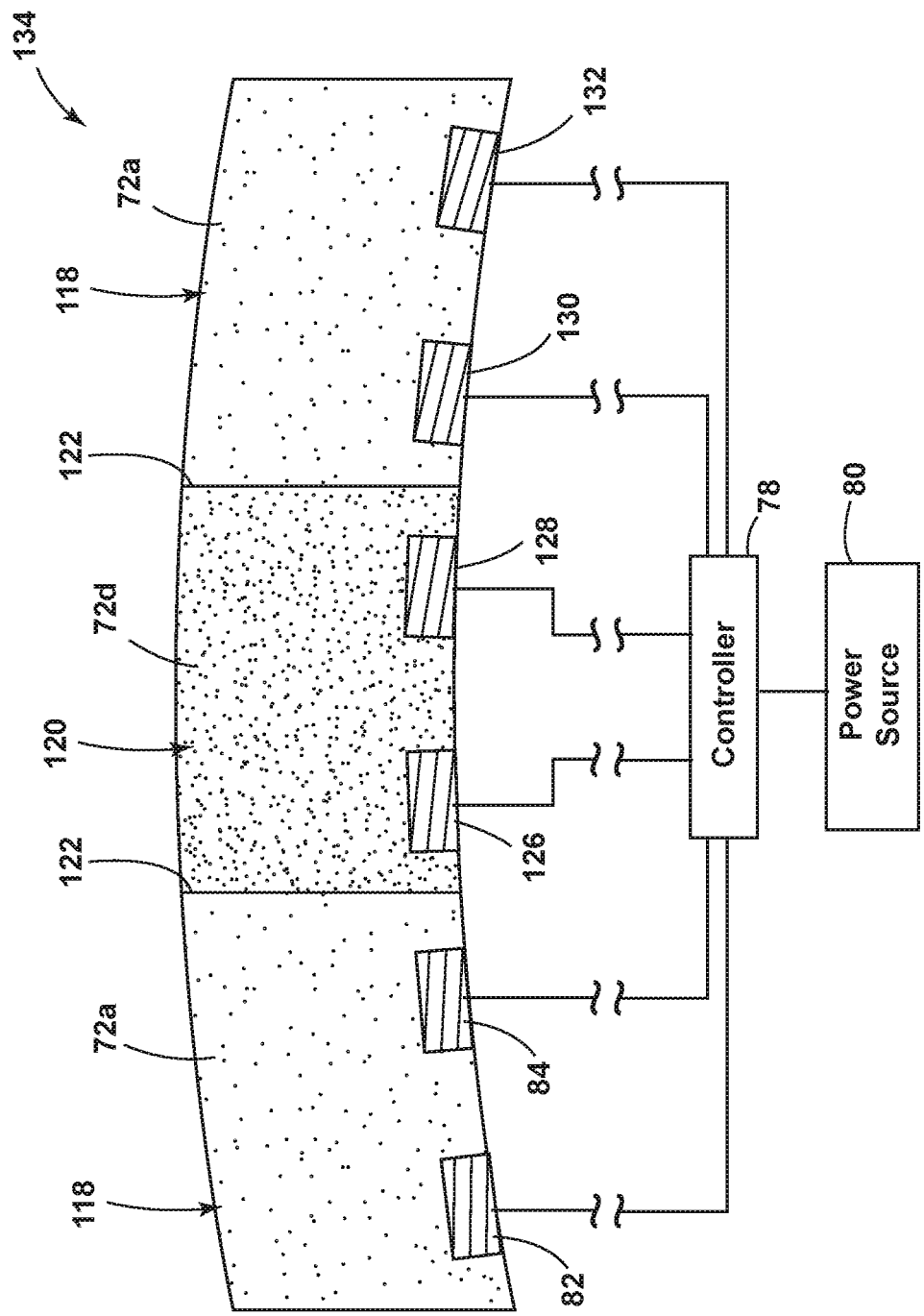
FIG. 5 illustrates a top view of a light-producing assembly, according to one embodiment, having varying types and concentrations of LED sources transversely along the light-producing assembly.

Referring to FIG. 5, a light-producing assembly 60, according to one embodiment, is illustrated from a top view having varying types and concentrations of LED sources 72a, 72d transversely along the light-producing assembly

60. As illustrated, a first portion 118 of the light-producing assembly 60 includes LED sources 72*a* that are configured to emit an excitation light 24 having an emission wavelength in a first color (e.g., red) spectrum. Likewise, a second portion 120 of the light-producing assembly 60 includes LED sources 72*d* that are configured to emit an excitation light 24 having an emission wavelength in a second color (e.g., orange) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. The insulative barriers 122 may also prevent a substantial amount of excitation light 24 from proximately illuminated LED sources 72*a*, 72*d* from crossing through the insulative barrier 122. Further, each portion 118, 120 disposed within the light-producing assembly 60 may include a respective bus bar 82, 84, 124, 126, 128, 130, 132 coupled to the controller 78 and configured to illuminate each respective portion 118, 120.

According to one embodiment, the first and second colors are visually distinguishable from one another. In this manner, LED sources 72*a* and 72*d* may be selectively activated using the controller 78 to cause the LED sources 72*a*, 72*d* to illuminate in a variety of colors. For example, the controller 78 may activate only LED sources 72*a* to exclusively illuminate a portion 118 of the light-producing assembly 60 in the first color. Alternatively, the controller 78 may activate only LED sources 72*d* to exclusively illuminate a portion 120 of the light-producing assembly 60 in the second color. It should be appreciated that the light-producing assembly 60 may include any number of portions 118, 120 having varying LED sources 72*a*, 72*d* that may illuminate in any desired color. Moreover, it should also be appreciated that the portions having varying LED sources 72*a*, 72*d* may be orientated in any practicable manner and need not be disposed adjacently.

As described above, a photoluminescent structure 10 may be disposed on a portion of the light-producing assembly 60. If desired, any of the LED sources 72*a*, 72*d* may be utilized for exciting any photoluminescent material 18 disposed proximately to and/or above the light-producing assembly 60.

The semiconductor ink 74 may also contain various concentrations of LED sources 72*a*, 72*d* such that the concentration of the LED sources 72*a*, 72*d*, or number of LED sources 72*a*, 72*d* per unit area, may be adjusted for various lighting applications. In some embodiments, the concentration of LED sources 72*a*, 72*d* may vary across the length of the light-producing assembly 60. For example, a first portion 118 of the light-producing assembly 60 may have a greater concentration of LED sources 72 than alternate portions 120, or vice versa. In such embodiments, the light source 44 and/or the indicia may appear brighter or have a greater luminance in order to preferentially illuminate predefined locations. In other embodiments, the concentration of LED sources 72*a*, 72*d* may increase or decrease with increasing distance from a preselected point.

According to one embodiment, the light-producing assembly 60 includes a higher concentration of LED sources 72*a* in the second portion 120 such that the second portion 120 may illuminate as a side marker, or turn indicator, while the first portion 118 provides incident lighting.

Figure 6:
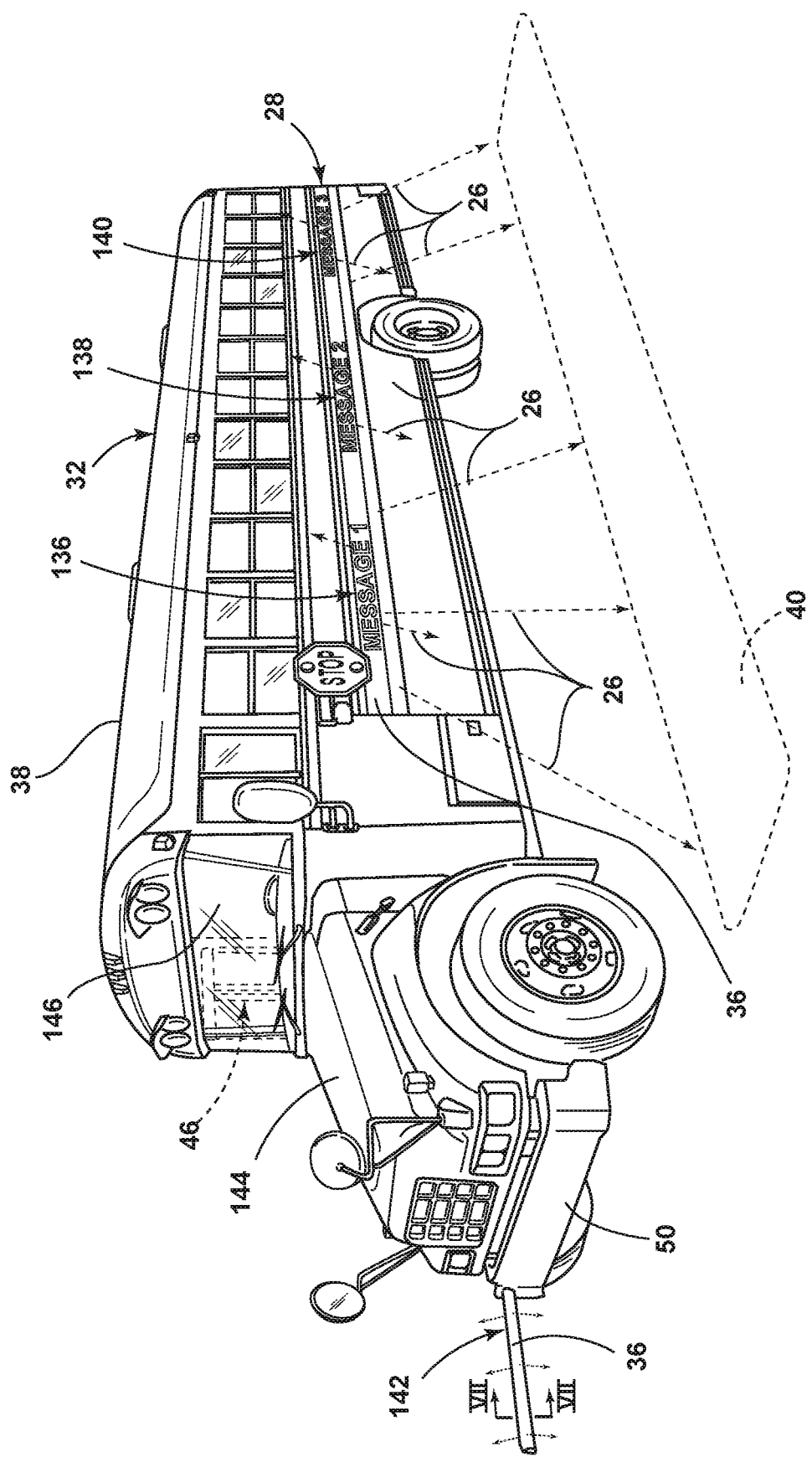
FIG. 6 illustrates a perspective view of a vehicle having a light-producing assembly attached to a body panel thereof and having one or more illuminable messages disposed thereon and a safety bar extending forwardly of the vehicle.

Referring to FIG. 6, the decorative layer may be configured to illuminate messages 136, 138, 140 and/or arrows as portions of the light strip 28 are illuminated. The messages 136, 138, 140 may be opaque portions on the decorative layer that are backlit when the light-producing assembly 60 is illuminated and/or as an energy conversion process is underway by the photoluminescent structure 10. For example, messages 136, 138, 140 such as "stop" and "cross" may illuminate to warn passengers to stay or move away or to guide them, respectively, as is deemed necessary by the driver, may be included. Each message 136, 138, 140 disposed within the light strip 28 may be provided on any portion of the vehicle 32.

The one or more light strips 28 disposed on the vehicle 32 may be switched on automatically via a switch which interfaces with the power source 80, with the opening of the door 46, such as by the turning on of a light in the stairwell of the door 46 of the vehicle 32 by operation of the door control, or by any other switch within the vehicle 32. Further, the light strip 28 may be turned on when a flashing light, provided, for example, at the rear side 48 (FIG. 3) of the vehicle 32 or on other surfaces, is turned on. Alternatively, the school bus driver may separately turn on or off the light strip 28. As another alternative, the illumination may respond to the vehicle's transmission state, e.g., park, drive, etc.

The light strip 28 may be turned off manually or automatically by using a control/timer that is started after the door 46 is closed or the flashing light is turned off. For example, the light strip 28 may be turned off approximately ten seconds, thirty seconds, or two minutes after the door 46 is closed or the flashing light is deactivated, or at some predetermined time. Alternatively, the light strip 28 may be turned off contemporaneously with the closing of the door 46 or the turning off of the flashing light.

With further reference to FIG. 6, the vehicle 32 may have a pedestrian guard 142 which projects forwardly from the front bumper 50, or any other front component of the vehicle 32, in which the operator of the vehicle 32 sits. The operator of the vehicle 32 sits in a seat (not shown), which is positioned rearwardly of a hood structure 144, and the operator looks out over the hood structure 144 through a front windshield 146 that is located above the rear end of the hood structure 144. Thus, the pedestrian guard 142 requires the children to cross in front of the standing vehicle 32, far enough ahead of the hood structure 144 so that at least the heads of the smallest school children will project within a line of sight of the operator of the vehicle 32. The pedestrian guard 142 may be retractable towards the body of the vehicle 32, such as the bumper, so that there is no protruding structure while the vehicle 32 is in motion.

The pedestrian guard 142 may include the light strip 28 thereon configured to illuminate one side and/or both sides thereof during extension of the pedestrian guard 142. The light strip 28 may have a reflective layer 54 such that the guard 142 is easily viewable during both daytime and nighttime conditions.

Figure 7:
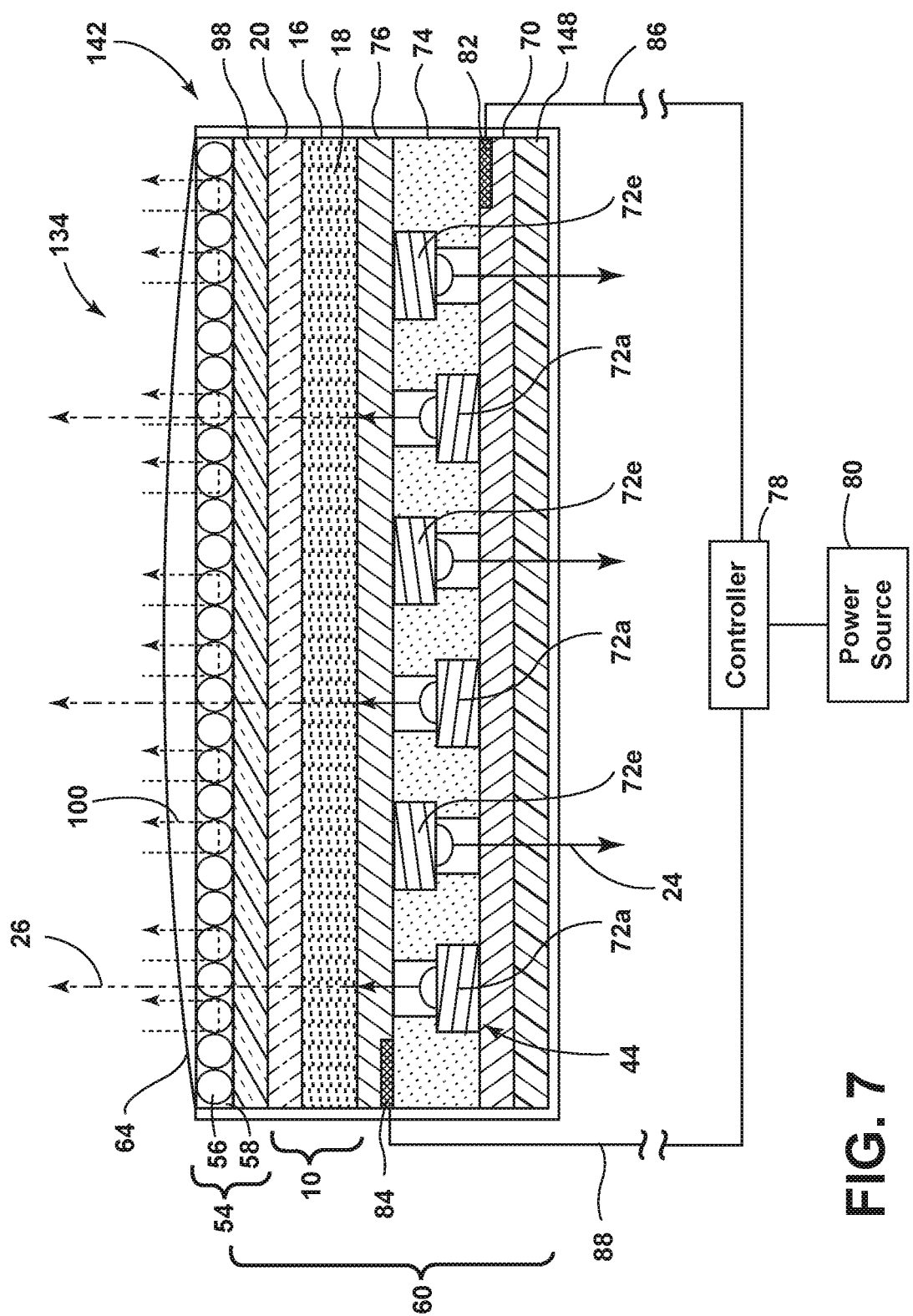
FIG. 7 is a cross-sectional view taken along line VII-VII of FIG. 6 illustrating the safety bar configured as a multi-directional light-producing assembly, according to one embodiment.

Referring to FIG. 7, the pedestrian guard 142 may include a light strip 28 having multidirectional printed LED sources 72*a*, 72*e* thereon. In the presently illustrated embodiment, a printed LED arrangement 162 includes a first plurality of LED sources 72*a* biased to direct light in a first direction of a light transmissive pedestrian guard substrate 148 and a second plurality of LED sources 72*e* is biased to direct in a second, opposing direction. As discussed above, the light-producing assembly 60 may further include the photoluminescent structure 10 arranged over the negative electrode 76 and/or the positive electrode 70 as a coating, layer, film or other suitable deposition.

First and second reflective layers 54 may be disposed, respectively, between the light sources 44 and both opposing viewable portions 64. According to an alternate embodiment, the light sources 44 on a first side of the pedestrian guard substrate 148 may be printed thereon while the light sources 44 on the opposing side of the pedestrian guard substrate 148 may be conventional, non-printed LEDs.

Figure 8:
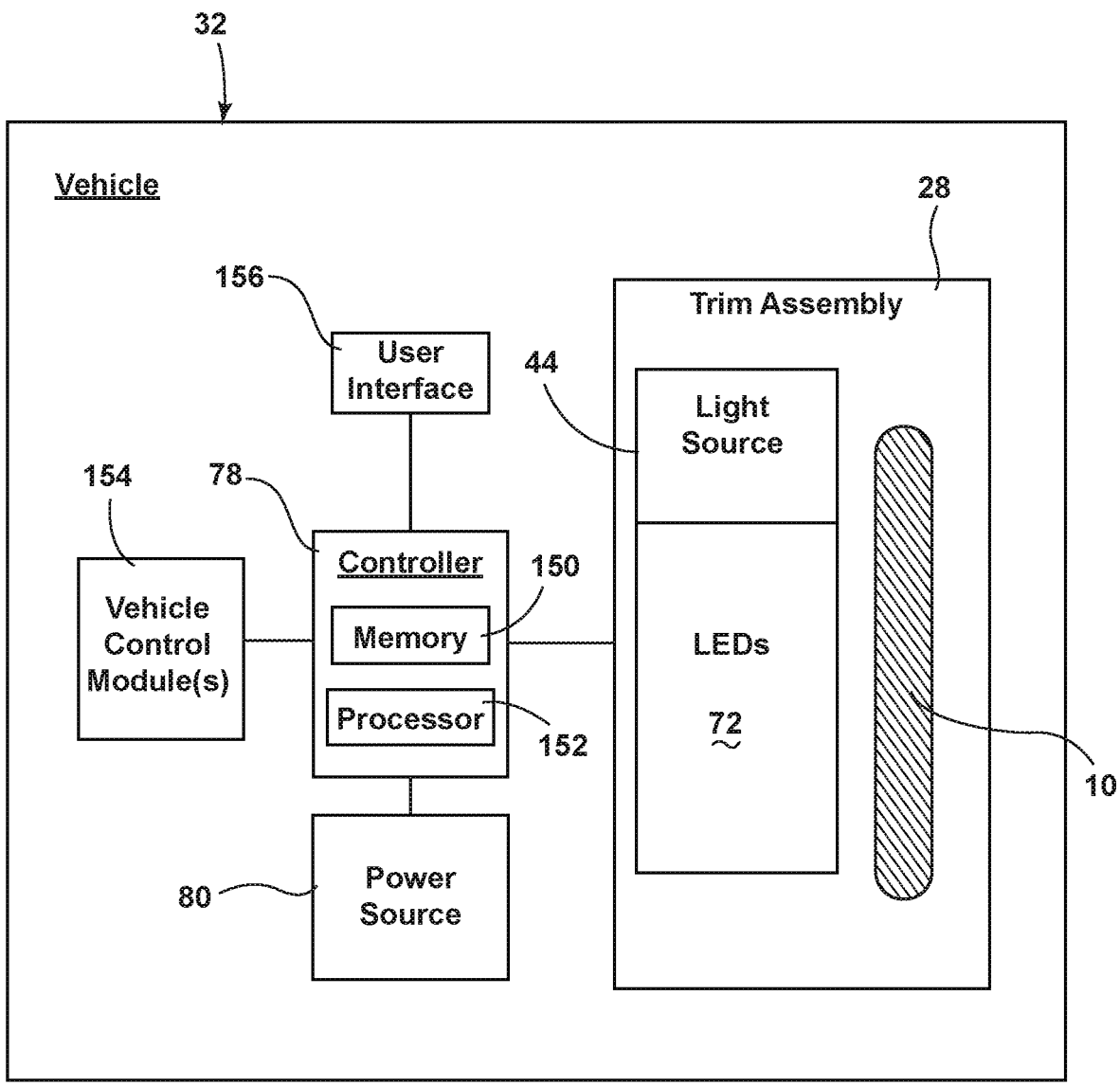
FIG. 8 is a block diagram of the vehicle, the light strip, and the lighting control.

Referring to FIG. 8, a block diagram of a vehicle 32 is shown in which the light strip 28 is implemented. The light strip 28 includes a controller 78 in communication with the light source 44. The controller 78 may include memory 150 having instructions contained therein that are executed by a processor 152 of the controller 78. The controller 78 may provide electrical power to the light source 44, or to a respective bus bar 82, 84, via a power source 80 located onboard the vehicle 32. In addition, the controller 78 may be configured to control the light output of each light source 44 based on feedback received from one or more vehicle control modules 154 such as, but not limited to, a body control module, engine control module, steering control module, brake control module, the like, and/or a combination thereof. By controlling the light output of the light source 44, the light strip 28 may illuminate in a variety of colors and/or patterns to provide an aesthetic appearance, or may provide vehicle information to an intended observer.

The processor 152 may receive an input from the shifting of the vehicle 32 from a park gear to a first gear (or vice versa), the opening or closing of the vehicle door 46, the turning on or off of one or more amber or red flashing school bus light to indicate boarding/disembarking, or the like. The processor 152 may also receive inputs from a user interface, which allows a driver to control the external lighting. The user interface 156 may be configured such that a user may control the wavelength of light that is emitted by the LED sources 72 and/or the LED sources 72 that are illuminated. The user interface 156 may be disposed within the vehicle cabin or on any surface that is accessible to the user during utilization of the light strip 28 described herein. The user interface 156 may use any type of control known in the art for controlling the light source 44, such as, but not limited to, proximity sensors.

In operation, each photoluminescent structure 10 may exhibit a constant unicolor or multicolor illumination. For example, the controller 78 may prompt the light source 44 to emit only the first wavelength of light via the LED sources 72 to cause the photoluminescent structure 10 to illuminate in the first color (e.g., white). Alternatively, the controller 78 may prompt the light source 44 to emit only the second wavelength of light via the LED sources 72 to cause the photoluminescent structure 10 to illuminate in the second color (e.g., red). Alternatively still, the controller 78 may prompt the light source 44 to simultaneously emit the first and second wavelengths of light to cause the photoluminescent structures 10 to illuminate in a third color (e.g., pinkish) defined by an additive light mixture of the first and second colors. Moreover, additional photoluminescent structures may be added to the light strip 28 that convert the excitation light 24 emitted from the light source 44 to a different wavelength. Alternatively still, the controller 78 may prompt the light source 44 to alternate between periodically emitting the first and second wavelengths of excitation light 24 to cause the photoluminescent structure 10 to periodically illuminate by alternating between the first and second colors of converted light 26. The controller 78 may prompt the light source 44 to periodically emit the first and/or second wavelengths of excitation light 24 at a regular time interval and/or an irregular time interval.

With respect to the above examples, the controller 78 may modify the intensity of the emitted first and second wavelengths of light by pulse-width modulation or current control. In some embodiments, the controller 78 may be configured to adjust a color of the outputted light by sending control signals to adjust an intensity or energy output level of the light source 44. For example, if the light source 44 is configured to output the first emission at a low level, substantially all of the excitation light 24 may be converted to the outputted, visible light. If the light source 44 is configured to emit excitation light 24 at a high level, only a portion of the excitation light 24 may be converted to the converted light 26 by the photoluminescent structure 10. In this configuration, a color of light corresponding to mixture of the excitation light 24 and the converted light 26 may be output as the outputted light. In this way, each of the controllers 78 may control an output color of the outputted light.

Though a low level and a high level of intensity are discussed in reference to the excitation light 24, it shall be understood that the intensity of the excitation light 24 may be varied among a variety of intensity levels to adjust a hue of the color corresponding to the emitted excitation and/or converted light 24, 26 from the light strip 28. As described herein, the color of the converted light 26 may be significantly dependent on the particular photoluminescent material 18 utilized in the photoluminescent structure 10. Additionally, a conversion capacity of the photoluminescent structure 10 may be significantly dependent on a concentration of the photoluminescent structures 10 utilized in the photoluminescent structure 10. By adjusting the range of intensities that may be emitted from the light source 44, the concentration and proportions of the photoluminescent materials 18 in the photoluminescent structure 10 and the types of photoluminescent materials 18 utilized in the photoluminescent structure 10 discussed herein may be operable to generate a range of color hues of outputted light by blending the excitation light 24 with the converted light 26. It is also contemplated that the intensity of each light source 44 may be varied simultaneously, or independently, from any number of other light sources 44.

Accordingly, a light strip for a vehicle has been advantageously described herein. The light strip provides various benefits including an efficient and cost-effective means to produce illumination that may function as a distinct styling element that increases the refinement of a vehicle, or any other product that may have an illumination assembly disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle light strip, comprising:
    a light-producing assembly including:
        a plurality of light sources arranged as a strip attached to a panel, the light-producing assembly angled in a downward direction to illuminate a ground surface;
        a first electrode coupled with the panel; and
        a second electrode spaced apart from the first electrode, wherein the plurality of light sources is operably coupled with one of the first and second electrodes, and further wherein the plurality of light sources is positioned between the first and second electrodes;
    one or more retroreflective beads configured to reflect an incident light directed towards the light-producing assembly, wherein the light-producing assembly is positioned between the one or more retroreflective beads and the panel and is configured to illuminate through the one or more retroreflective beads;
    a photoluminescent structure disposed on the light-producing assembly and configured to luminesce in response to excitation by the plurality of light sources, wherein the photoluminescent structure is positioned between the one or more retroreflective beads and the light-producing assembly; and
    an optic operably coupled with the light-producing assembly and disposed externally of the one or more retroreflective beads for distributing an excitation light in a predefined direction.

2. The vehicle light strip of claim 1, further comprising:
    an adhesive layer, wherein the one or more retroreflective beads may be embedded within the adhesive layer.

3. The vehicle light strip of claim 1, wherein the one or more retroreflective beads are disposed within a reflective layer that is configured to reflect an incident light directed toward the reflective layer from a first side and allow converted light therethrough from a second, opposing side.

4. The vehicle light strip of claim 3, further comprising:
    a decorative layer disposed above the photoluminescent structure having opaque portions that are backlit to confer messages to an onlooker.

5. The vehicle light strip of claim 1, wherein the plurality of light sources comprises LED sources dispersed in a printed LED arrangement.

6. The vehicle light strip of claim 1, wherein the photoluminescent structure includes at least one photoluminescent material therein configured to convert an excitation light received from the light-producing assembly into a visible converted light.

7. The vehicle light strip of claim 1, wherein the light-producing assembly is configured to illuminate in a plurality of colors.

8. A vehicle light strip, comprising:
    a light source disposed on a surface of a pedestrian guard and including a first printed LED oriented in a first direction and a second printed LED oriented in a second, opposing direction, wherein the first printed LED is coupled with a first electrode and the second printed LED is coupled with a second electrode, and further wherein the first printed LED is spaced apart from the second printed LED; and
    a translucent reflective layer configured to reflect an incident light directed at a first side of the reflective layer and allow a converted light directed at a second, opposing side of the reflective layer to pass therethrough, wherein the first and second printed LEDs are positioned between the reflective layer and the surface of the pedestrian guard.

9. The vehicle light strip of claim 8, further comprising:
    a photoluminescent structure 21 disposed on the light source and configured to luminesce in response to excitation by the light source.

10. The vehicle light strip of claim 9, wherein the photoluminescent structure includes at least one photoluminescent material therein configured to convert an excitation light received from the light-producing assembly into a visible converted light.

11. The vehicle light strip of claim 9, further comprising:
    an adhesive layer, wherein one or more retroreflective beads may be embedded within the adhesive layer.

12. The vehicle light strip of claim 8, wherein the reflective layer includes one or more retroreflective beads configured to reflect an incident light directed towards the light-producing assembly.

13. The vehicle light strip of claim 8, wherein the pedestrian guard is movable between a retracted position and an extended position and light is emitted from the light source in a cross-car direction when the pedestrian guard is extended.

14. A vehicle light strip, comprising:
    a first light source oriented in a first direction and a second light source oriented in a second, opposing direction, wherein the first light source is spaced apart from the second light source;
    a photoluminescent structure disposed on the first light source; and
    a translucent reflective layer positioned outwardly of the first light source and configured to reflect an incident light directed at a first side of the reflective layer and allow light from the first light source through a second, opposing side and out the first side, wherein the photoluminescent structure is positioned between the first light source and the reflective layer, and further wherein the photoluminescent structure abuts the second opposing side.

15. The vehicle light strip of claim 14, wherein the first light source includes a first plurality of LED sources and the second light source includes a second plurality of LED sources, the second plurality of LED sources positioned to alternate with the first plurality of LED sources and further wherein a controller selectively activates one of the first and second pluralities of light sources.

16. The vehicle light strip of claim 14, wherein one of the first and second light sources comprises LED sources dispersed in a printed LED arrangement that are each configured to emit an excitation light.

17. The vehicle light strip of claim 16, wherein the reflective layer includes a retroreflective material therein.

18. The vehicle light strip of claim 16, wherein the photoluminescent structure includes a long persistence phosphorescent material.

19. The vehicle light strip of claim 14, wherein the photoluminescent structure comprises at least one photoluminescent material configured to perform an energy conversion on an excitation light received from at least a portion of one of the first and second light sources into a visible, converted light that is outputted to a viewable portion.

20. The vehicle light strip of claim 14, wherein the photoluminescent structure includes a short persistence photoluminescent material therein that is configured to illuminate for 100 milliseconds or less once one of the first and second light sources returns to an unilluminated state.

* * * * *